United States Patent [19]

Takai

[11] Patent Number: 4,743,913

[45] Date of Patent: May 10, 1988

[54] HYBRID NAVIGATION SYSTEM FOR DETERMINING A RELATIVE POSITION AND DIRECTION OF A VEHICLE AND METHOD THEREFOR

[75] Inventor: Hideo Takai, Yokohama, Japan

[73] Assignee: Nissan Motor Company, Limited, Japan

[21] Appl. No.: 15,999

[22] Filed: Feb. 18, 1987

[30] Foreign Application Priority Data

Feb. 19, 1986 [JP] Japan ................................. 61-32897
Feb. 19, 1986 [JP] Japan ................................. 61-32898

[51] Int. Cl.$^4$ .......................................... G01C 17/38
[52] U.S. Cl. ..................................... 342/457; 33/356; 342/357; 364/457; 364/449
[58] Field of Search ............... 342/351, 357, 450, 457, 342/463, 464; 33/356, 357, 361; 324/302, 226, 244, 247; 73/178 R; 364/420, 423, 424, 443, 447, 449, 454, 457, 444, 559, 571

[56] References Cited

U.S. PATENT DOCUMENTS

| | | | |
|---|---|---|---|
| 4,300,390 | 11/1981 | Shimizu | 73/178 R |
| 4,445,118 | 4/1984 | Taylor et al. | 342/357 |
| 4,445,279 | 5/1984 | Tsushima et al. | 33/356 |
| 4,578,678 | 3/1986 | Hurd | 347/357 |
| 4,622,754 | 11/1986 | Chujo et al. | 33/356 |
| 4,673,878 | 6/1987 | Tsushima et al. | 33/361 X |
| 4,686,772 | 8/1987 | Sobel | 33/356 X |

FOREIGN PATENT DOCUMENTS

| | | | |
|---|---|---|---|
| 0042807 | 3/1982 | Japan | 33/356 |
| 0148360 | 3/1983 | Japan | 33/356 |
| 58-48811 | 3/1983 | Japan . | |
| 0110110 | 12/1983 | Japan | 33/356 |
| 0129609 | 7/1985 | Japan | 33/356 |

*Primary Examiner*—Theodore M. Blum
*Assistant Examiner*—Bernarr Earl Gregory
*Attorney, Agent, or Firm*—Lowe, Price, LeBlanc, Becker & Shur

[57] ABSTRACT

A hybrid navigation system for determining a relative position and direction of a vehicle and method therefor. In the hybrid navigation system and method, a magnitization quantity on a vehicle body which affects an output detection result of a geomagnetic sensor is calculated on the basis of a forwarding direction data derived from such as a GPS (Global Positioning System) absolute position calculating circuitry. Furthermore, in order to prevent an erroneous determination of the relative position and direction of the vehicle, the calculation on the relative position and direction of the vehicle on the basis of the detection result of the geomagnetic sensor is halted when the vehicle does not run on a straight road.

15 Claims, 15 Drawing Sheets

VEHICLE RUNNING ROAD

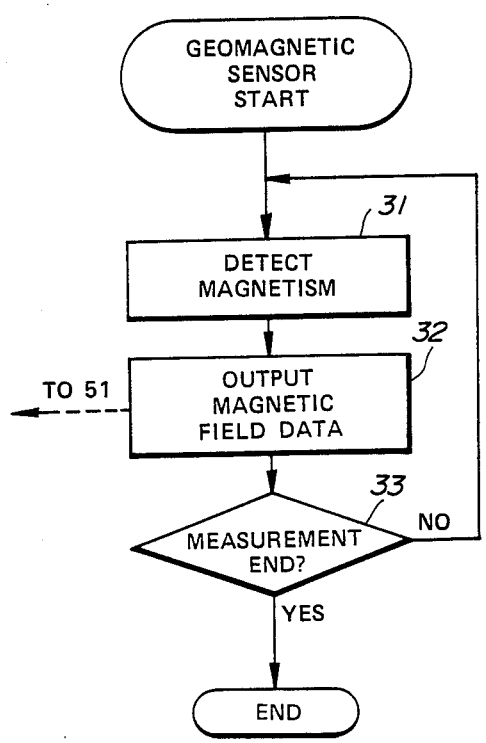

HYBRID NAVIGATION SYSTEM FOR DETERMINING A RELATIVE POSITION AND DIRECTION OF A VEHICLE AND METHOD THEREFOR

BACKGROUND OF THE INVENTION

The present invention relates to a hybrid navigation system including an electromagnetic wave navigation receiving apparatus and geomagnetic sensor especially but not exclusively installed in an automotive vehicle, and more particularly relates to the hybrid navigation system for determining a relative position and direction of the vehicle and method therefor in which an intensity of magnetization on a vehicle body is calculated and which compensate for an erroneous determination of the relative position and direction thereof.

In general, a magnetization often occurs on a vehicle body when the vehicle runs on a road. To determine continuously the relative position and direction to, e.g., a destination of the vehicle, the hybrid navigation system uses a GPS (Global Positioning System) receiving apparatus and a geomagnetic sensor. However, when the vehicle runs on a road, the magnetization affects the detection result of the geomagnetic sensor so that an accurate measurement of the relative position and direction of the vehicle cannot be achieved.

To cope with such a problem described above, a technique for correcting an output of the geomagnetic sensor for compensating for the magnetization of the vehicle body has conventionally been proposed.

A Japanese Patent Application First Publication No. (Tokkai) Sho 58-48811 published on Mar. 22, 1983 exemplifies such a technique as described above.

In the above-identified Japanese Patent document, the correction technique is such that with a turn of the vehicle through 360°, center point coordinates of an output data of the geomagnetic sensor is detected and an effect of the intensity of magnetization of the vehicle body on the output of the geomagnetic sensor is eliminated.

In the conventional technique on the correction for the magnetization of the vehicle body, however, the correction of the directional data derived from the geomagnetic sensor cannot be carried out without sampling of the directional data of the vehicle during one circular turn of the vehicle. In addition, to take a sampling of the directional data during one circular turn of the vehicle, a considerable time and distance may be required from the start of the sampling to the end of the sampling when the vehicle runs. Therefore, if a magnetization state on the vehicle body changes during the sampling operation, an erroneous correction has resulted.

Furthermore, since the correction based on the direction data derived by the circular turn sampling is carried out in such a way that data not falling in a usually expected data limit are delted to reduce an error of the correction value due to external disturbances, the correction cannot be made any more if a large change occurs in the magnetized state of the vehicle body.

SUMMARY OF THE INVENTION

It is an object of the present invention to provide the hybrid navigation system for determining the relative position and direction of the vehicle and method therefor in which a forwarding direction data of the vehicle is derived by an electromagnetic wave navigation absolute position calculating part and the correction for the detection result of the geomagnetic sensor for compensating for an erroneous detection result of the geomagnetic sensor due to the magnetization on the vehicle body is carried out on the basis of the forwarding direction data derived by the electromagnetic wave navigation absolute position calculating part so that an accurate indication of the forwarding direction by means of the geomagnetic sensor can be achieved.

It is another object of the present invention to provide the hybrid navigation system for determining the relative position and direction of the vehicle and method therefor in which the forwarding direction data is derived by the electromagnetic wave navigation absolute position calculating part in a state where the vehicle actually runs on a straight lane so that a more accurate correction of the detection result of the geomagnetic sensor against the vehicle body magnetization can be achieved.

The above-described objects can be achieved by providing a system for determining a relative position and direction of a moving object, comprising: (a) first means for receiving a navigation electromagnetic wave, calculating an absolute position of the moving object on the basis of the received electromagnetic wave, and deriving a forwarding direction data of the moving object with respect to an orientation of the geomagnetism on the basis of the calculated absolute position; (b) second means for detecting a direction of the moving object with respect to the orientation of the geomagnetism and an intensity of the geomagnetism on the moving object; (c) third means for correcting a detection result of the second means to compensate for a magnetization on a body of the moving object on the basis of the forwarding direction data derived from the first means; (d) fourth means for detecting a distance by which the moving object has moved; and (e) fifth means for calculating the relative position and direction of the moving object on the basis of the detection result of the fourth means and corrected detection result of the second means derived from the third means.

The above-described objects can also be achieved by providing a navigation system installed in a moving object, comprising: (a) first means for receiving a navigation electromagnetic wave and calculating an absolute position of the moving object on the basis of the received navigation electromagnetic wave; (b) second means for detecting a direction of the moving object with respect to the geomagnetism and magnitude of a magnetic field on the moving object with respect to the geomagnetism; (c) third means for detecting a distance by which the moving object moves; (d) fourth means for calculating a magnetization quantity on the moving object using forwarding direction data of the moving object calculated from a plurality of adjacent absolute position data of the moving object by the first means and using a plurality of magnetic field data derived from the second means; and (e) fifth means for receiving the magnetization quantity data on the moving object derived from the fourth means and for calculating the distance by which the moving object moves and a relative forwarding direction of the moving object without influence of the magnetization on the moving object on the detection result of the second means.

The above-described objects can also be achieved by providing a method for determining a relative position and direction of a vehicle, comprising the steps of: (a) preparing an X,Y orthogonal coordinates according to an orientation of the geomagnetism; (b) preparing a forwarding direction data with respect to the Y coordinate derived from first means for calculating an absolute position of the vehicle; (c) preparing a forwarding direction data with respect to the Y coordinate derived from second means for detecting an orientation of the vehicle with respect to the geomagnetism and magnitude of a magnetic field on the vehicle with respect to the geomagnetism; (d) deriving a center point coordinate data deviated from an origin of X,Y coordinates due to a magnetization on a vehicle body on the basis of the forwarding direction data derived by the first and second means; and (e) deriving a relative position and direction of the vehicle on the basis of the center point coordinate data, forwarding direction data derived by the second means and vehicle running distance data derived by third means for detecting a distance by which the vehicle has run.

DETAILED DESCRIPTION OF THE PREFERRED EMBODIMENTS

Reference will hereinafter be made to the drawings in order to facilitate understanding of the present invention.

FIRST PREFERRED EMBODIMENT

Figure 1:
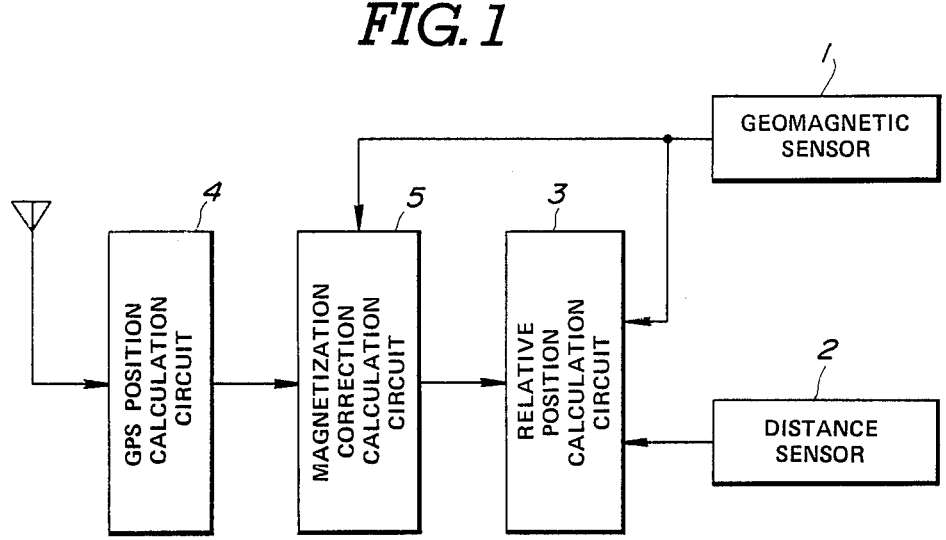
FIG. 1 is a simplified circuit block diagram of a hybrid navigation system in a first preferred embodiment according to the present invention.

FIG. 1 shows a circuit block diagram of a hybrid navigation system for determining a relative position and direction of a vehicle in a first preferred embodiment.

In FIG. 1, the hybrid navigation system includes: (a) a geomagnetic sensor 1 which converts a magnetic field of geomagnetism into two voltage components X and Y according to an orientation of a vehicle body (not shown) with respect to a direction of the geomagnetism; (b) a distance sensor 2 which generates and outputs a distance signal whenever the vehicle travels by a predetermined distance; and (c) a relative position calculation circuit 3 which calculates a relative position and direction of the vehicle on the basis of a forwarding direction data derived from X, Y coordinate data from the geomagnetic sensor 1 and a distance data derived by the distance sensor 2. The hybrid navigation system further includes a GPS (Global Positioning System) absolute position calculation circuit which receives an electromagnetic wave transmitted a GPS geostationary satellite and calculates an absolute position of the vehicle. In addition, the hybrid navigation system further includes a magnetization correction calculation circuit 5 which calculates a magnetization quantity on the basis of the forwarding direction data calculated from the absolute position of the vehicle by the GPS absolute position calculation circuit 4 and magnetic field data derived by the geomagnetic sensor 1.

The constructions of geomagnetic sensor 1 and distance sensor 2 are exemplified by a U.S. Pat. No. 4,622,754 issued on Nov. 18, 1986.

In addition, the construction and operation of GPS absolute position calculation circuit 4 are exemplified by a U.S. Pat. No. 4,445,118 issued on Apr. 24, 1984. The disclosures of the above-identified two United States Patent documents are hereby incorporated by reference.

Next, an operation of the hybrid navigation system described above will be described in details.

The geomagnetic sensor 1 comprises a magnetic field vector detector having a ring core. The magnetic field vector detector outputs X and Y coordinate directional voltage components according to the orientation of the vehicle with respect to the direction of the geomagnetism.

Figure 2:
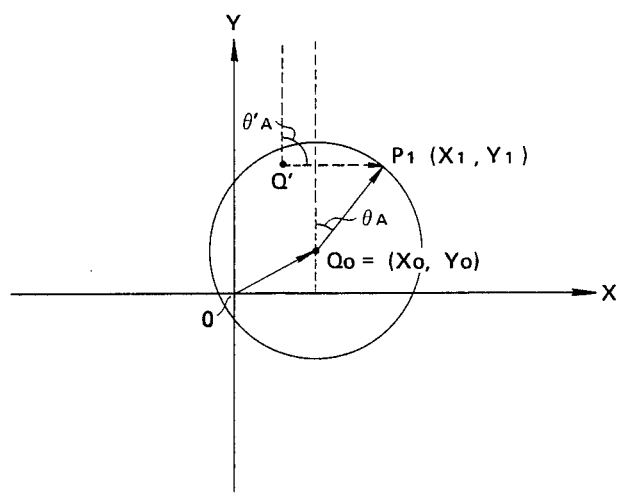
FIG. 2 is a coordinate graph representing a deviation of center point coordinates on a magnetic field data derived by a geomagnetic sensor due to a magnetization on a vehicle body.

When the vehicle travels through a complete circle, X coordinate and Y coordinate directional voltage components take a circular form as shown in FIG. 2.

However, if the vehicle body is magnetized when the vehicle travels through a certain point of place, a magnetic field generated due to the magnetization on the vehicle body has an influence on the detection data of the geomagnetic sensor 1. A position of a center point Qo ($Q_o=X_o$, $Y_o$) of the circle is deviated from a reference point O, i.e., an origin of the X, Y coordinates. In addition, the forwarding direction of the vehicle with respect to the orientation of the geomagnetism corresponds to an angle $\theta_A$ at which a vector $\overline{Q_oP_1}$ is intersected to a Y axis when the output voltage components of the geomagnetic sensor 1 are expressed in terms of X, Y coordinates as $P_1=(X_1, Y_1)$, as shown in FIG. 2.

The relative position calculation circuit 3 then calculates the vector $\overline{Q_oP_1}$ expressed by the forwarding direction and multiplies the vector $\overline{OP_1}$ by the distance signal of the distance sensor 2 to obtain the relative position and direction of the vehicle with respect to, e.g., a destination. On the other hand, if the magnetization quantity, i.e., intensity of magnetization of the vehicle body is changed and the actual center point coordinates Q are deviated and shifted to another center point coordinates Q', the forwarding direction of the vehicle is changed to a different angle $\theta_A'$ even though the output result of the geomagnetic sensor 1 is the same as $P_1$ ($P_1=(X_1, Y_1)$). It is, therefore, necessary to always detect the coordinates of the correct center point and to automatically correct the erroneous detection result of the geomagnetic sensor on the basis of the deviated center point coordinates if the center point coordinates are deviated from the reference point due to the change in magnetization state of the vehicle body.

Next, the GPS absolute position calculation circuit 4 can receive the electromagnetic wave transmitted by a GPS geostationary satellite and can make an accurate measurement of the absolute position of the vehicle on the basis of a propagation delay of the received wave and so on. In a case where the absolute position measurement by means of the GPS position calculation circuit 4 is carried out, the absolute position measurement cannot continuously be carried out if an obstacle against the arrival of the electromagnetic wave is present between the vehicle in which the GPS position calculation circuit 4 is installed and GPS geostationary satellite. This is because the GPS position calculation circuit 4 cannot receive the satellite electromagnetic wave due to the presence of such an obstacle. Therefore, if the position measurement by means of the GPS position calculation circuit 4 becomes impossible, the position measurement is compensated for that carried out by means of the geomagnetic sensor 1.

Figure 3:
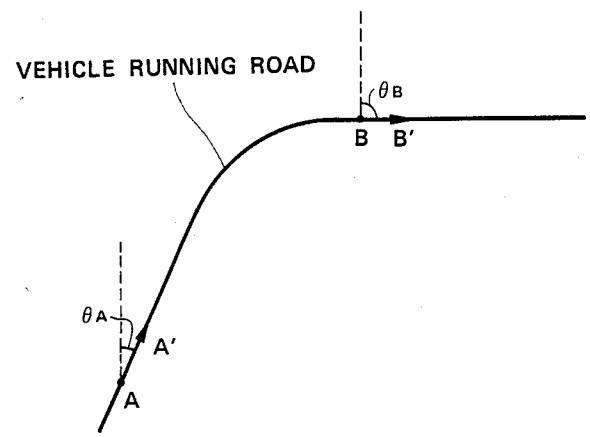
FIG. 3 is a simplified model view for explaining a correction operation for compensating for an erroneous detection result of the geomagnetic sensor due to the vehicle body magnetization by means of a GPS (Global Positioning System) absolute position calculation circuit in the first preferred embodiment shown in FIG. 1.

During the vehicle run on a road, the GPS absolute position calculation circuit 4 calculates a vehicle dorwarding direction $\theta_A$ on the basis of the results of location measurement at a point A and of location measurement at an adjoining point A' to the point A as shown in FIG. 3.

Figure 4:
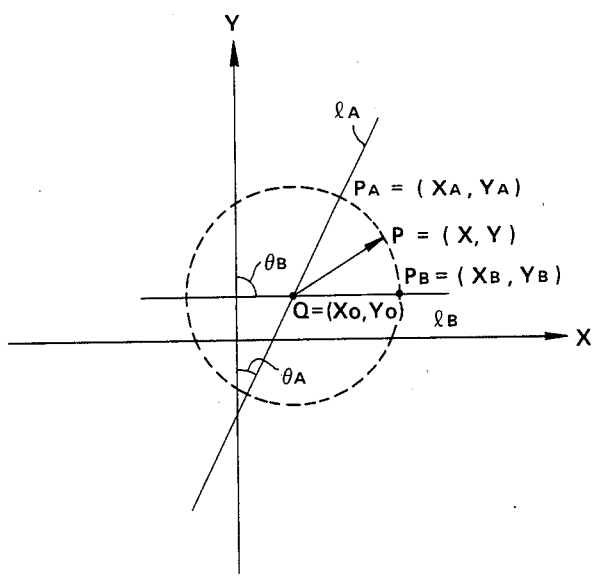
FIG. 4 is a coordinate graph for explaining a calculation of the magnetization quantity on a vehicle body by means of a magnetization quantity calculation circuit in the first preferred embodiment shown in FIG. 1.

The magnetization correction calculation circuit 5 receives the forwarding direction data $\theta_A$ derived from the GPS position calculation circuit 4 and calculates an average value $P_A$ ($P_A=(X_A, Y_A)$) of a plurality of detection results derived from the geomagnetic sensor 1, e.g., to the same points A, A' as shown in FIG. 4. Then, the magnetization correction calculation circuit 5 derives a straight line $l_A$ on the X, Y coordinates which intersects at an angle of $\theta_A$ derived by the GPS absolute position calculation circuit 4 to the Y axis and passes through a point representing the average value of $P_A$ ($P_A=(X_A, Y_A)$) of the detection results derived by the geomagnetic sensor 1 as shown in FIG. 5. In addition, the GPS absolute position calculation circuit 4 calculates another forwarding direction $\theta_B$ of the vehicle at other adjoining two points B, B' as shown in FIG. 3. The magnetization correction calculation circuit 4 simultaneously calculates an output average value $P_B$($P_B=(X_B, Y_B)$) of the plurality of detection results of the geomagnetic sensor 1, and derives another straight line $l_B$ in the same manner as the straight line $l_A$ shown in FIG. 4.

From an intersection Q ($Q=(X_o, Y_o)$) between both straight lines $l_A$, $l_B$, the magnetization correction calculation circuit 5 produces actual center point coordinates Q as shown in FIG. 4. The actual center point coordinates are used to determine the relative position and direction of the vehicle on the basis of the detection result of the geomagnetic sensor 1. The center point coordinate data Q ($Q=(X_o, Y_o)$) derived in this way is sent to the relative position calculation circuit 3 shown in FIG. 1. The relative position and direction of the vehicle are calculated with the center point coordinates Q being set to a center point of the relative position calculation. In other words, the vector QP representing the magnetic field data P ($P=(X, Y)$) derived from the geomagnetic sensor 1 with respect to the center point coordinates Q is set on the X, Y coordinates and the distance signal from the distance sensor 2 is multiplied by the directional data represented by the vector $\overline{QP}$. Consequently, the relative distance by which the vehicle has run and the relative forwarding direction of the vehicle can accurately be determined.

Figure 5A:
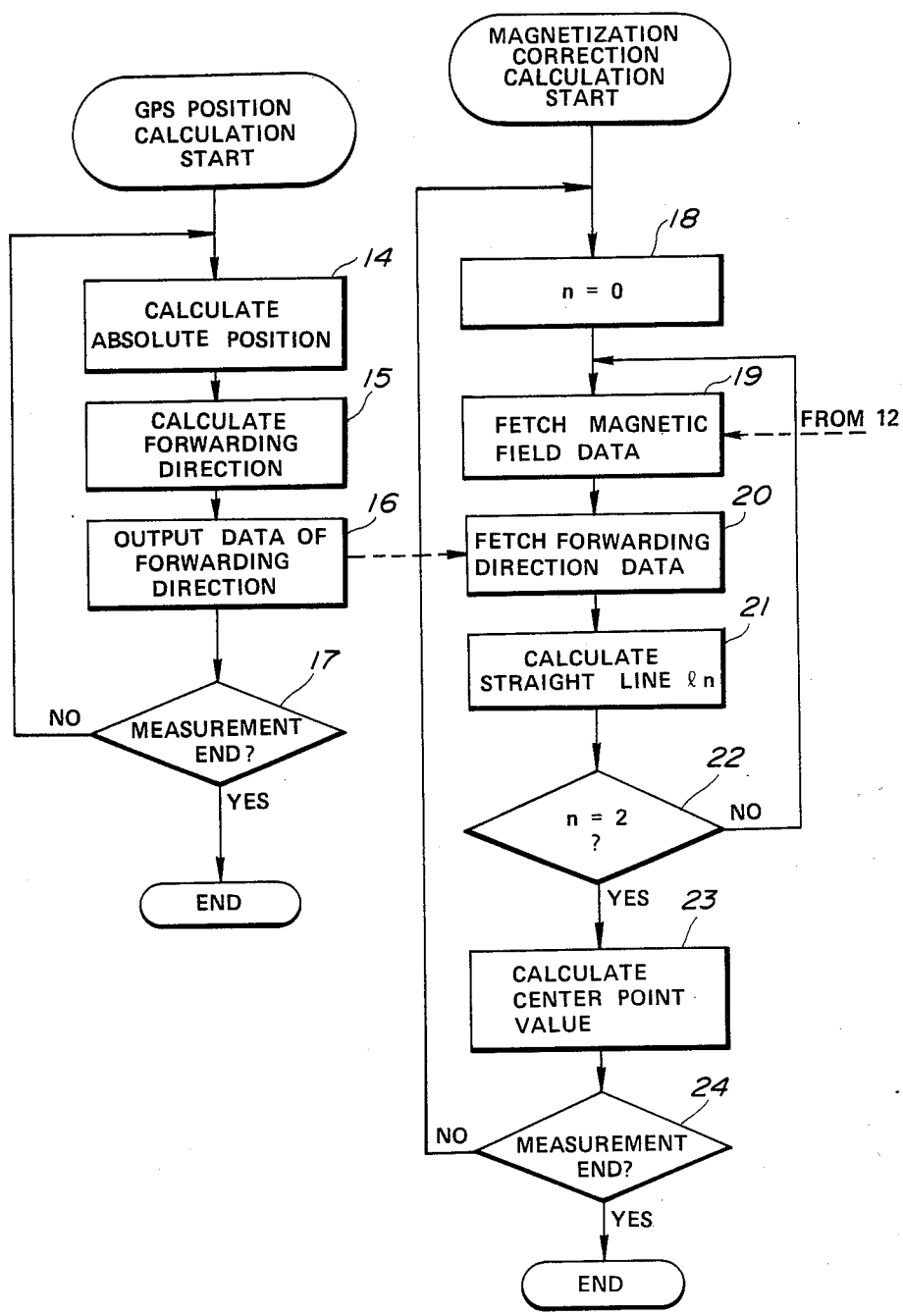
FIGS. 5 (a) and 5 (b) are integrally operational flowcharts for explaining a whole operation of the first preferred embodiment shown in FIG. 1.
Figure 5:
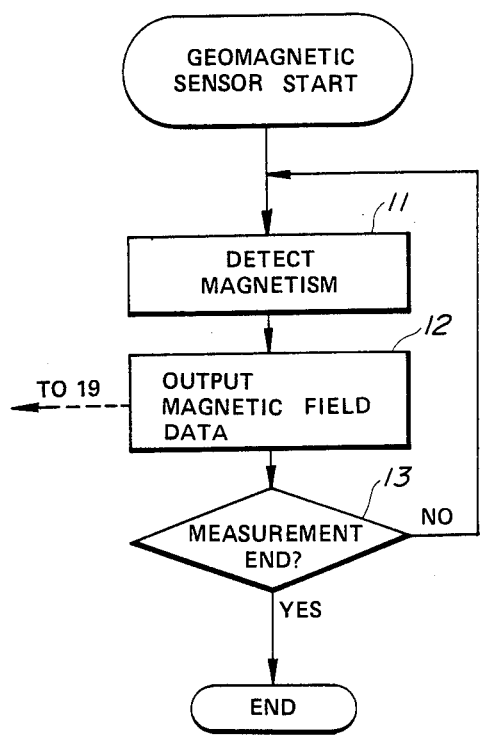

FIGS. 5(a) and 5(b) show integrally operation flowcharts of the hybrid navigation system in the first preferred embodiment.

In steps 14, 15, 16, and 17, the GPS absolute position calculation circuit 4 produces the forwarding direction data $\theta_A$ of the vehicle from the measurement results of positions at the point A and adjacent point A' shown in FIG. 3.

In steps 18, 19, 20, 21, and 22, the magnetization correction calculation circuit 5 calculates the straight line $l_A$ shown in FIG. 4 from the forwarding direction data $\theta_A$ at the two points A and A' calculated by the GPS absolute position calculation circuit 4 and, e.g., the average value $P_A$ ($P_A=(X_A, Y_A)$) of the output data from the geomagnetic sensor 1. In addition, the magnetization correction calculation circuit 5 calculates the other straight line $l_B$ shown in FIG. 4 from the forwarding direction data $\theta_B$ at the other adjacent points B and B' calculated by the GPS absolute position calculation circuit 4 and from the average value $P_B$ ($P_B=(X_B, Y_B)$) of the output data of the geomagnetic sensor 1.

In a step 23, the intersection Q ($Q=(X_o, Y_o)$) of the two straight lines $l_A$, $l_B$ calculated from the magnetic field output data of the geomagnetic sensor 1 and forwarding direction data at the different points A and B. The intersection Q represents the actual center coordinates of the geomagnetic sensor 1.

It is noted that in steps 11, 12, and 13, the geomagnetic sensor 1 produces the magnetic field data with respect to the orientation of the geomagnetism.

It is noted that although in the first preferred embodiment, the GPS absolute position calculation circuit 4 is used for the electromagnetic wave navigation calculation circuit, other electromagnetic wave navigation apparatus such as a Loran (Long range navigation) C receiving apparatus, Omega navigation apparatus and so on may be used in place of it. In addition, although the actual center coordinates are derived from the two straight lines $l_A$ and $l_B$ at the different two points of locations, it is also possible to derive the actual center point coordinates from equal to or more than three mutually different straight lines.

SECOND PREFERRED EMBODIMENT

Figure 6:
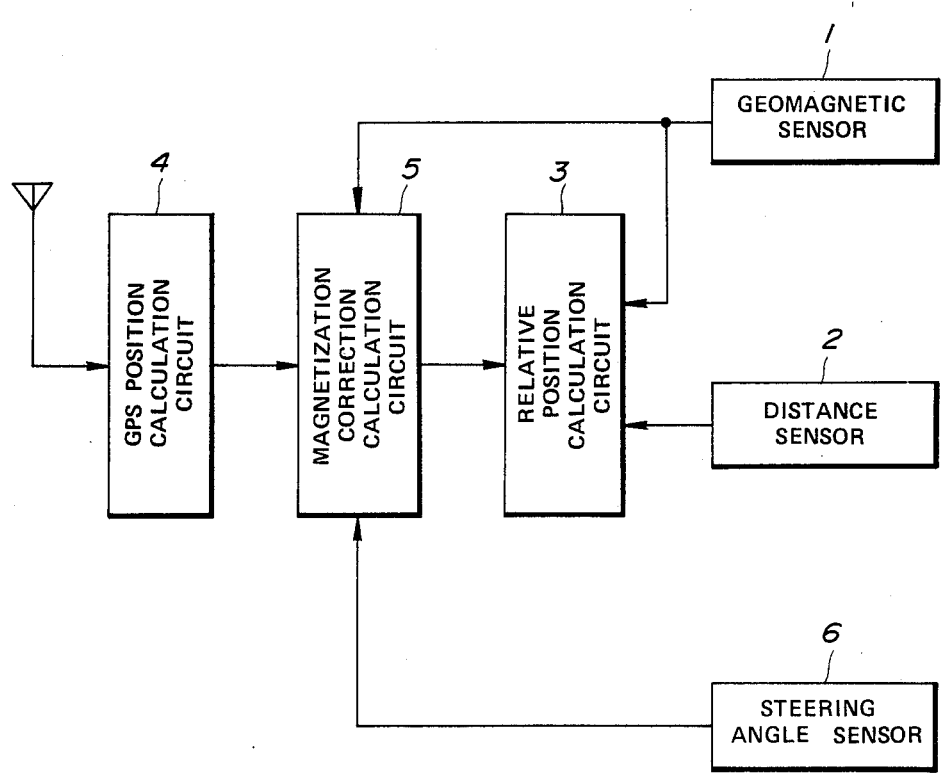
FIG. 6 is a simplified circuit block diagram of the hybrid navigation system in a second preferred embodiment according to the present invention.

FIG. 6 shows a circuit block diagram of the hybrid navigation system in a second preferred embodiment according to the present invention.

The hybrid navigation system shown in FIG. 6 includes the geomagnetic sensor 1, distance sensor 2, relative position calculation circuit 3, GPS position calculation circuit 4, and magnetization correction calculation circuit 5 in the same way as those in the first preferred embodiment.

The hybrid navigation system in the second preferred embodiment further includes a steering angle sensor 6.

The steering angle sensor 6 constitutes a straight lane running detecting means which determines whether a road through which the vehicle travels is a straight road. The steering angle sensor 6 detects a steering angular displacement of a steering wheel of the vehicle and sends a steering signal indicative thereof to the magnetization correction calculation circuit 5. The construction of the steering angle sensor 5 is exemplified by a U.S. Pat. No. 4,342,279 to Yasutoshi Seko et, al. The disclosure of the U.S. Patent document identified above is hereby incorporated by reference.

Next, an operation of the hybrid navigation system in the second preferred embodiment will be described below.

The geomagnetic sensor 1, distance sensor 2, relative position calculation circuit 3, and GPS absolute position calculation circuit 4 have the same functions as those shown in the first preferred embodiment.

Figure 9A:
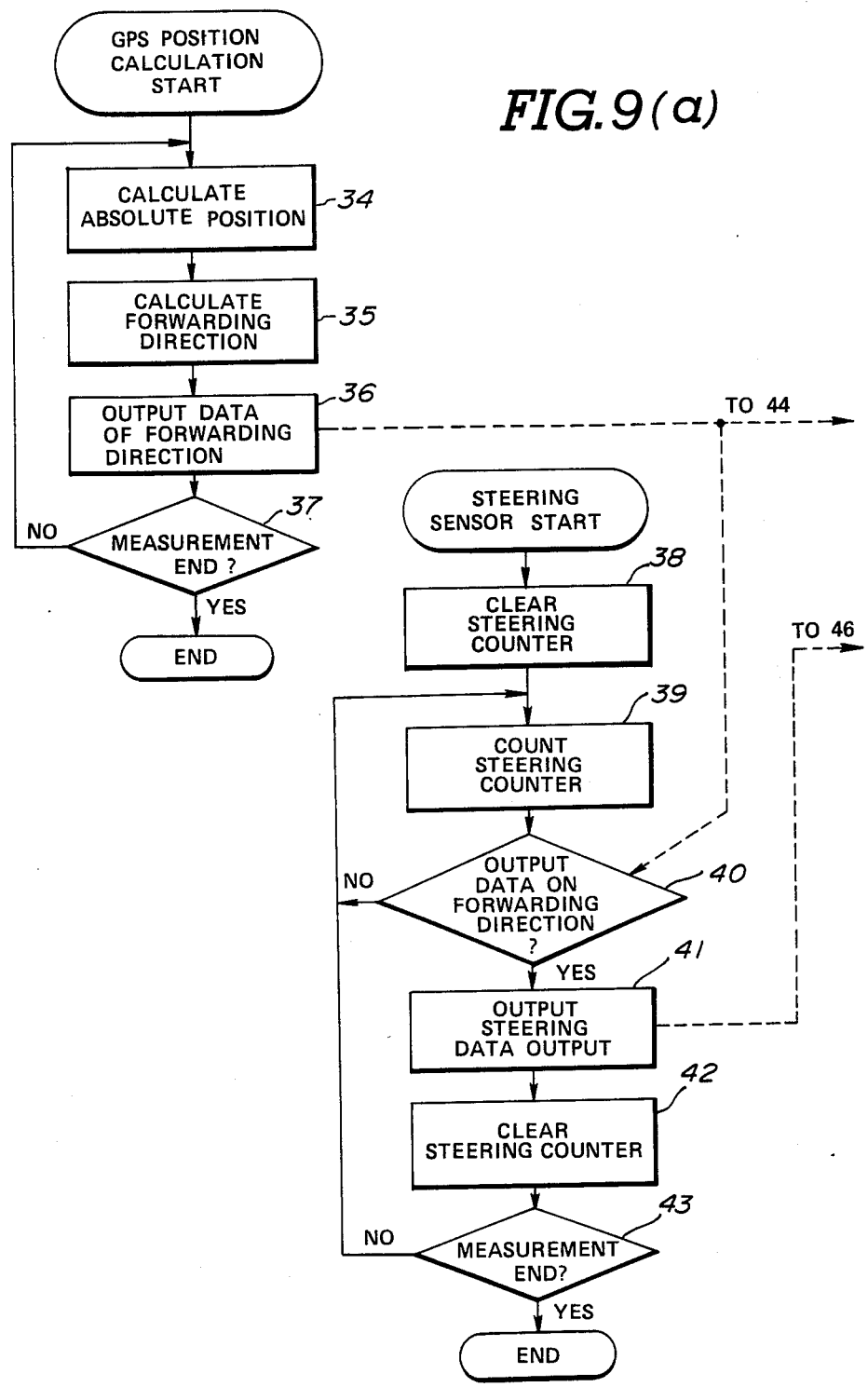
FIGS. 9 (a) and 9 (b) are integrally operational flowcharts for explaining the whole operation of the second preferred embodiment shown in FIG. 6.
Figure 9B:
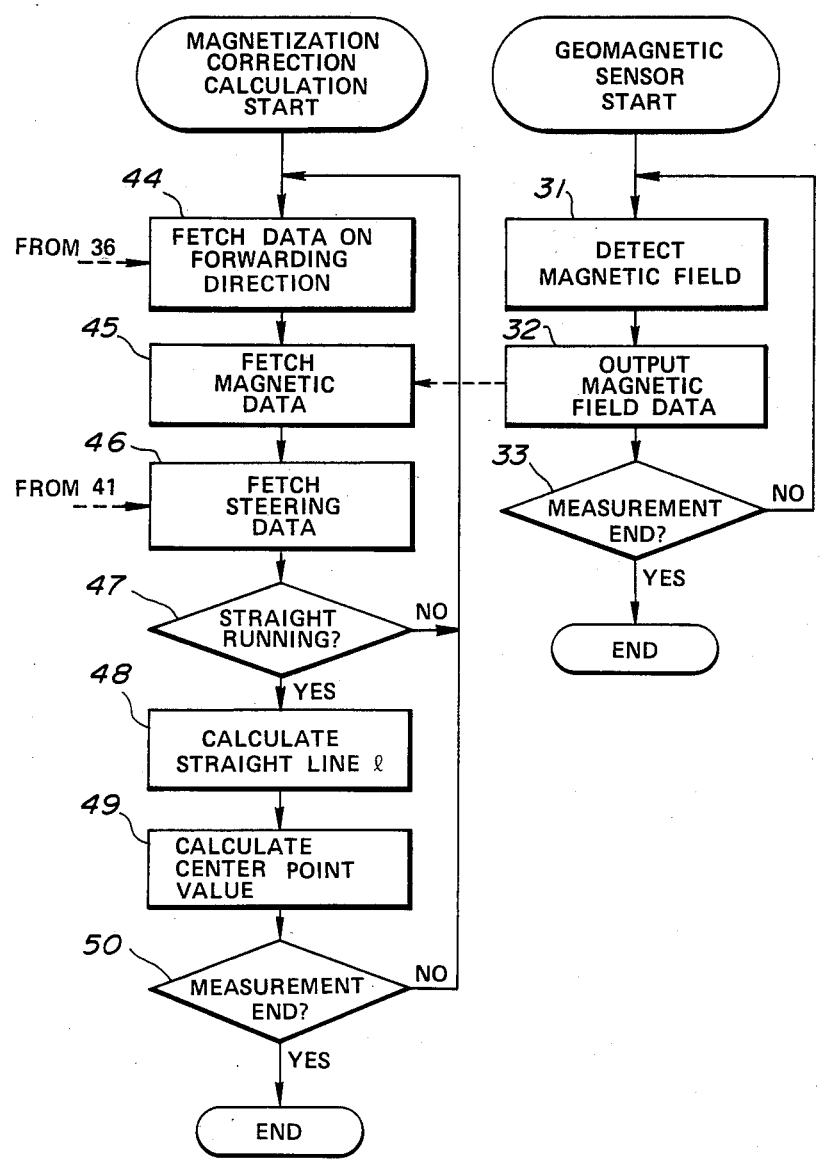

FIGS. 9(a) and 9(b) show integrally flowcharts for explaining the whole operation of the hybrid navigation system shown in FIG. 6.

In steps 31, 32, and 33, the geomagnetic sensor 1 outputs two directional voltage components X, Y according to the direction of the vehicle with respect to the orientation of magnetic field of the geomagnetism. The distance sensor 2 outputs the distance signal whenever the vehicle travels through the predetermined distance. The GPS position calculation circuit 4 receives the electromagnetic wave from the GPS geostationary satellite, calculates the absolute position of the vehicle on the earth, and determines the forwarding direction of the vehicle from a difference between the results of position measurements at adjacent two points.

Figure 7A:
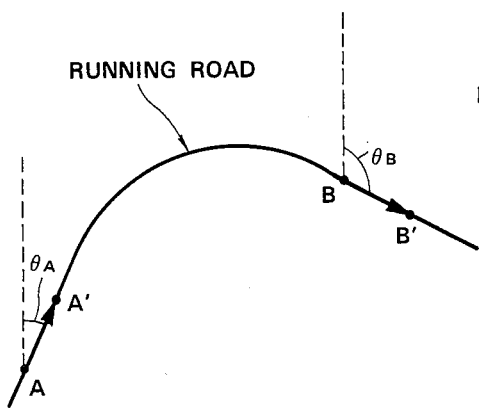
FIGS. 7 (a) and 7 (b) are simplified model views for explaining an operation of the GPS absolute position calculation circuit in the second preferred embodiment shown in FIG. 6.

In other words, in steps 34 through 37, the forwarding direction $\theta_A$ is calculated from a difference between the results of position measurements at the adjacent two points A and A' as shown in FIG. 7(a).

The magnetization correction calculation circuit 5 derives the direction straight line $l_A$ from the forwarding direction $\theta_A$ calculated by the GPS position calculation circuit 4 and from the magnetic field average output data $P_A$ ($P_A=(X_A, Y_A)$) at the adjacent two points A and A'. In addition, the magnetization correction calculation circuit 4 derives the other straight line $l_B$ from the result of position measurement at other adjacent two points B and B' during the vehicle run and magnetic field average output data $P_B$ ($P_B=(X_B, Y_B)$) at the same points B and B' calculated on the basis of the output data of the geomagnetic sensor 1. An intersection (Q=($X_o$, $Y_o$)) of the different arbitrary straight lines $l_A$ and $l_B$ is derived thereafter. The intersection Q denotes the center point coordinates of the magnetic field voltage output data X and Y of the geomagnetic sensor 1. A deviation of the center point from the reference point due to the vehicle body magnetization is corrected in the way described above.

Figure 7B:
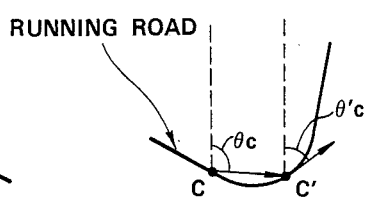
Figure 8A:
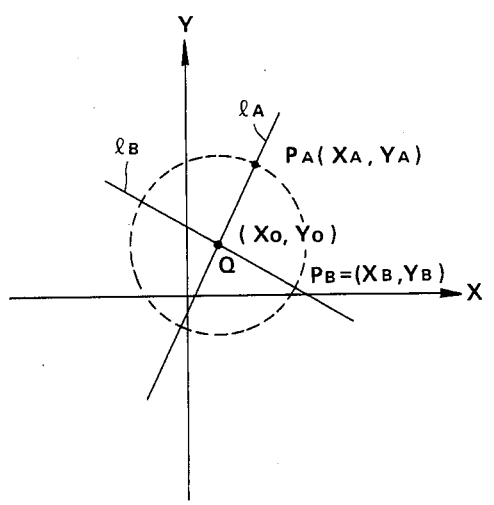
FIGS. 8 (a) and 8 (b) are coordinate graphs each for explaining the operation of the magnetization correction calculation circuit in the second preferred embodiment shown in FIG. 6.
Figure 8B:
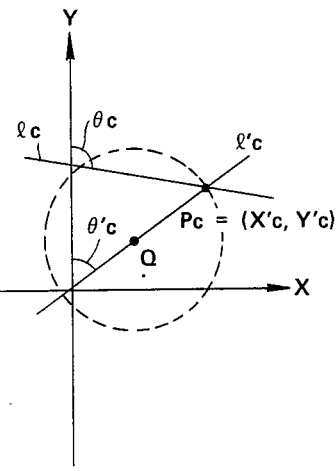

Next, the GPS position calculation circuit 4 calculates the forwarding direction from the results of position measurements at still other adjacent two points C and C' during the vehicle run on a curved road as shown in FIG. 7(b). However, the geomagnetic sensor 1 indicates a different forwarding direction $\theta_c'$ at an adjacent point C'. The forwarding direction of the vehicle is different at the point C and at the point C'. Hence, as naturally shown in FIG. 8(b) the magnetization correction calculation circuit 5 erroneously derives a directional straight line $l_C$ in place of deriving a directional straight line $l_C'$ which would naturally be indicated. Consequently, the accurate measurement of direction cannot be made during the vehicle run on such a curved road.

Therefore, in the second preferred embodiment, the steering angle sensor 6 detects the steering angle of the steering wheel. A steering counter (not shown in FIG. 6) incorporated in the steering angle sensor 6 further determines that the vehicle runs on the straight road when the steering wheel is turned below a predetermined steering angular displacement limit until the vehicle travels through the points of locations A and A'. The steering angle sensor 6 then outputs an enable signal indicating that the vehicle is running on the straight road to the magnetization correction calculation circuit 5, in steps 38 through 43.

Upon the receipt of the enable signal from the steering angle sensor 6, the magnetization correction calculation circuit 5 calculates the directional straight line $l_A$ using the magnetic field output data P (P=(X, Y)) from the geomagnetic sensor 1 and forwarding direction data from the GPS position calculation circuit 4. In other words, in a case when the vehicle runs on points A and A' as shown in FIG. 7(a), the steering angle sensor 6 outputs the enable signal to the magnetization correction calculation circuit 5. The magnetization correction calculation circuit 5 calculates the direction straight line $l_A$ shown in FIG. 8(b) in steps 44 through 48. However, the steering angle sensor 6 does not output the enable signal to the magnetization correction calculation circuit 5 between such two adjacent points as points C and C' shown in FIG. 7 (b) in step 47.

In this way, the center point coordinate Q (Q=($X_o$, $Y_o$)) for the actual geomagnetic sensor output data is prepared from the intersection of two different direction straight lines when the vehicle runs on the straight road in step 49. Consequently, a more accurate correction for the magnetization on the vehicle body can be achieved in the second preferred embodiment.

THIRD PREFERRED EMBODIMENT

Figure 10:
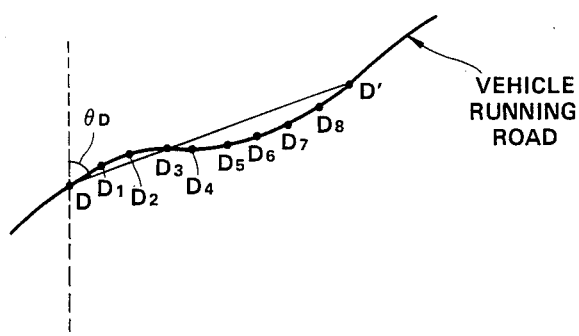
FIG. 10 is a simplified model view for explaining a calculation method for determining whether the vehicle runs on a straight road in a third preferred embodiment according to the present invention.
Figure 11:
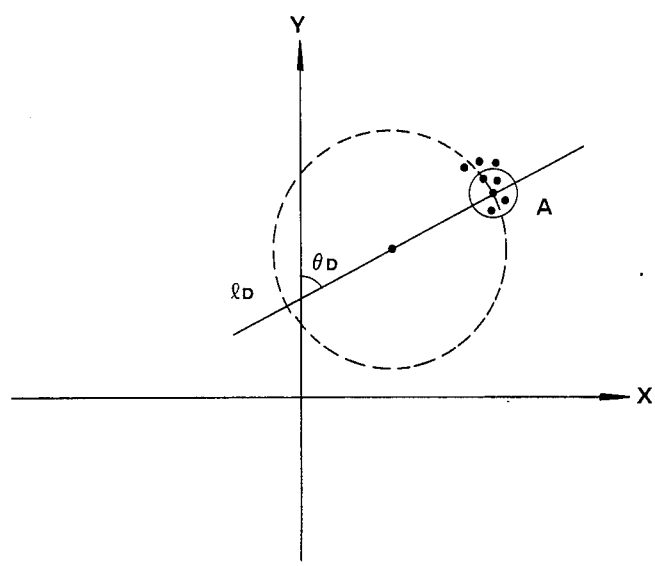
FIG. 11 is a coordinate graph for explaining an operation of the magnetization correction calculation circuit for determining whether the vehicle runs on the straight road in the third preferred embodiment.
Figure 12A:
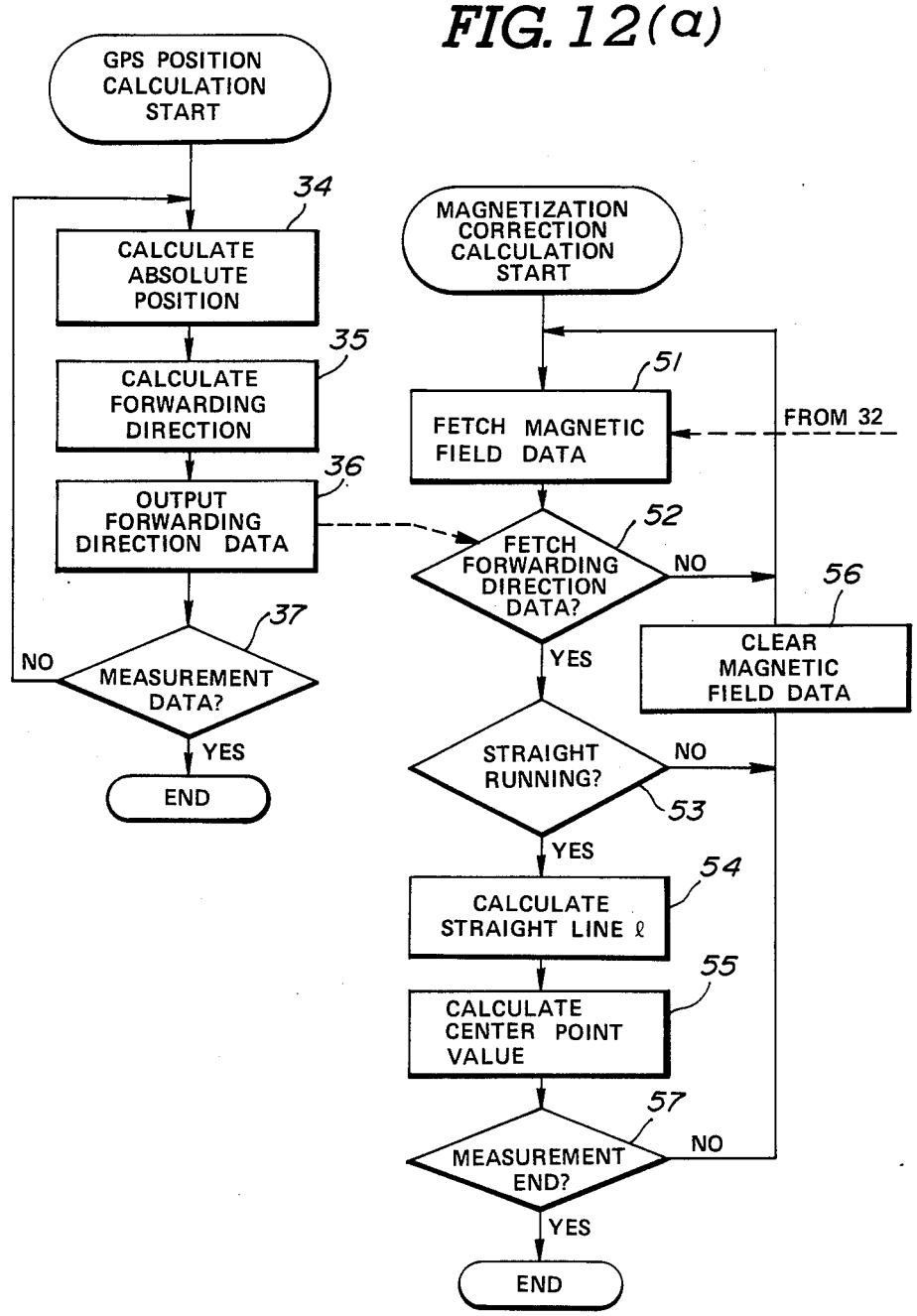
FIGS. 12 (a) and 12 (b) are integrally flowcharts for explaining the whole operation of the third preferred embodiment according to the present invention.

FIGS. 10 through 12 (b) show a third preferred embodiment according to the present invention.

In this embodiment, the steering angle sensor 6 as described in the second preferred embodiment is omitted and a straight running determining function is incorporated into the magnetization correction calculation circuit 5 itself. In other words, in steps 34 through 37, and 52 of FIGS. 12 (a) and 12 (b), the GPS position calculation circuit 4 calculates the absolute position at yet other two adjacent points D and D', as shown in FIG. 10, calculates the forwarding direction $\theta_D$ of the vehicle from the two points D and D'. The calculated result is sent to the magnetization correction calculation circuit 5. The geomagnetic sensor 1 sends the magnetic field output data $D_1, D_2, \ldots D_m$ to the magnetization correction calculation circuit 5 within a short time interval when the vehicle travels from the point D to the point D'. The geomagnetic sensor 1 simultaneously sends magnetic field output data to the magnetization correction calculation circuit 5 as in steps 31 through 33 and step 51. The magnetization correction calculation circuit 5 thus determines whether the magnetic field output data $D_1, D_2, \ldots, D_8$ between the two adjacent points D and D' fall within a predetermined range of value in order to determine whether the vehicle runs on the straight road.

In FIG. 11, when all magnetic field data are included in a region A, the magnetization correction calculation circuit 5 determines that the vehicle runs on the straight road and derives the directional straight line $l_D$ in steps 53 and 54.

Another forwarding direction straight line at another point on the straight road is derived in the same way. The intersection of the two straight lines is determined from the mutually different two straight lines in the same way as described above to derive the actual center point coordinates.

In steps 53 and 56, when the magnetic field output data are present which do not fall in the region A in FIG. 11, the magnetization correction calculation circuit 5 determines that the vehicle does not run on the straight road. The calculation on the directional straight line 1 is inhibited. The calculation of the directional straight line at still another point on the straight road is carried out in steps 53 and 56. Although in the second and third preferred embodiments the average value of the magnetic field output data between the adjacent two points is used as the magnetic field data output of the geomagnetic sensor 1, the magnetic field output data between any arbitrary adjacent two points may be used in a case where the vehicle runs on the straight road.

FOURTH PREFERRED EMBODIMENTS

Figure 13:
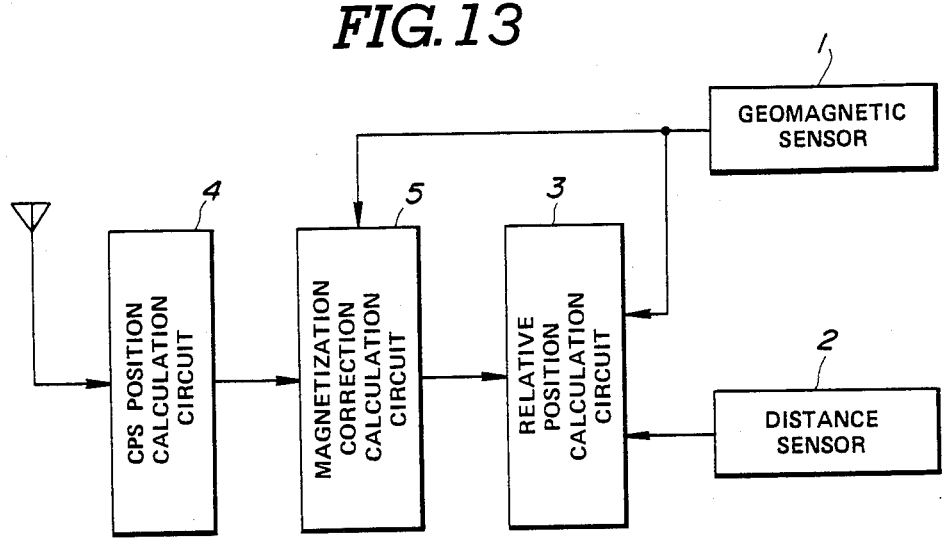
FIG. 13 is a simplified circuit block diagram of the hybrid navigation system in a fourth preferred embodiment according to the present invention.
Figure 14:
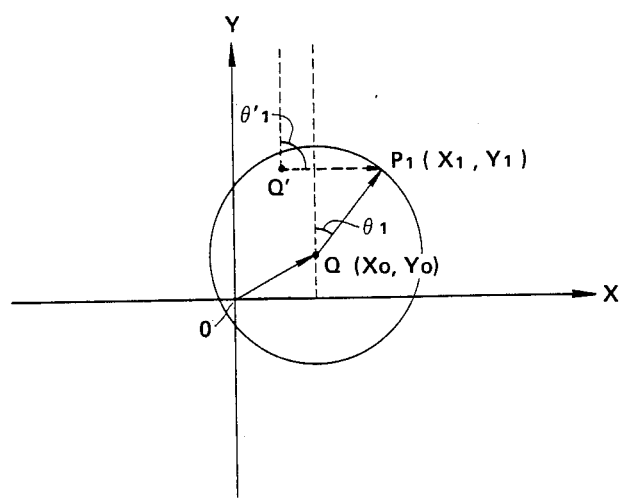
FIG. 14 is a coordinate graph for explaining the vehicle body magnetization effect on the detection result of the geomagnetic sensor.

FIG. 13 shows a circuit block diagram of the navigation system in a fourth preferred embodiment.

The constructions of the geomagnetic sensor 1, distance sensor 2, relative position calculation circuit 3, and GPS position calculation circuit 4 are substantially the same as those in the first preferred embodiment.

The magnetization correction calculation circuit 5 calculates a magnetization quantity on the vehicle body on the basis of the forwarding direction data from the GPS absolute position calculation circuit 4, magnetic field output data from the geomagnetic sensor 1, and a magnitude of a horizontal component of the geomagnetism predetermined in a territory within which the vehicle moves and sends the calculated magnetization quantity to the relative position calculation circuit 3.

The operation of the hybrid navigation system in the fourth preferred embodiment will be described below with reference to FIGS. 14 through 17.

The relative position calculation circuit 3 calculates a vector $\overline{QP_1}$ representing the forwarding direction and determines the relative position of the vehicle by multiplying the vector $QP_1$ by the distance signal derived from the distance sensor 2.

When the center point coordinates are deviated to Q' due to the change in the magnetization intensity on the vehicle body, the forwarding direction of the vehicle is changed to $\theta_1'$ even through the magnetic field output data represented by $P_1=(X_1, Y_1)$ from the geomagnetic sensor 1 is present. Therefore, it is necessary to always detect the correct center point coordinates and to correct the center point coordinates if they are deviated.

On the other hand, the GPS position calculation circuit 4 receives the electromagnetic wave from the GPS geostationary satellite and carries out the absolute position measurement of the vehicle.

The GPS absolute position calculation circuit 4 calculates the forwarding direction $\theta_A$ on the basis of the results of two position measurements at point A and at the adjacent point thereto A'.

Figure 16:
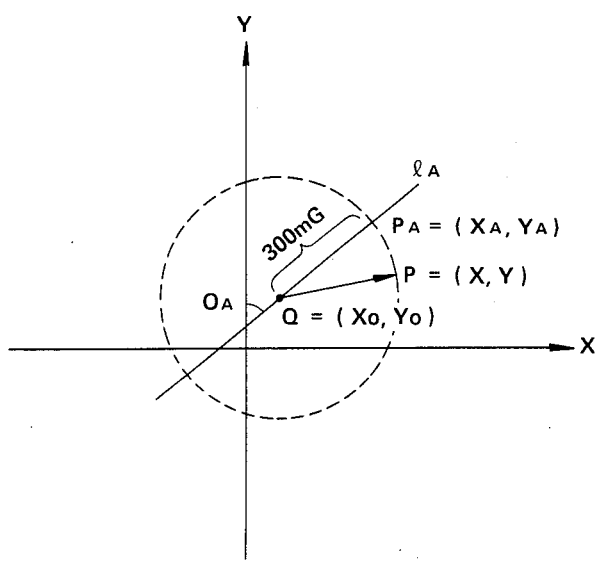
FIG. 16 is a coordinate graph for explaining an operation for deriving center point coordinates by means of the magnetization correction calculation circuit in the fourth preferred embodiment shown in FIG. 13.

The magnetization correction calculation circuit 5 fetches the magnetic field output data represented by $P_A=(X_A, Y_A)$ from the geomagnetic sensor 1 and the forwarding direction data $\theta_A$ from the GPS absolute position calculation circuit 4. Consequently, the forwarding direction straight line $l_A$ is calculated as shown in FIG. 16. It should be noted that in the magnetization correction calculation circuit 5, the magnitude of the magnetic field is provided since the magnitude of the magnetic field caused by the geomagnetism in the horizontal component thereof is previously set to a constant value (about 300 mG). The magnetization correction calculation circuit 5 derives the center point coordinates Q ($Q=X_o, Y_o$)) separated by a distance corresponding to 300 mG from the magnetic field output data $P_A(P_A=(X_A, Y_A))$ in the directional straight line $l_A$. The derived point Q is set as the center point coordinates (steps 20A and 21A in FIG. 17(a)). The center point coordinate information thus obtained is sent to the relative position calculation circuit 3. The relative position calculation circuit 3 calculates the vector $\overline{QP}$ with respect to the magnetic field voltage components Q ($Q=(X, Y)$) derived from the geomagnetic sensor 1 in the same way as described in the previous embodiments. The relative position is derived by multiplying the distance signal derived from the distance sensor 2 by the vector $\overline{QP}$ representing the forwarding direction with respect to the orientation of the geomagnetism. The correction calculation for eliminating the effect of the magnetization on the vehicle body can be carried out at a regular interval during the vehicle run.

Figure 17A:
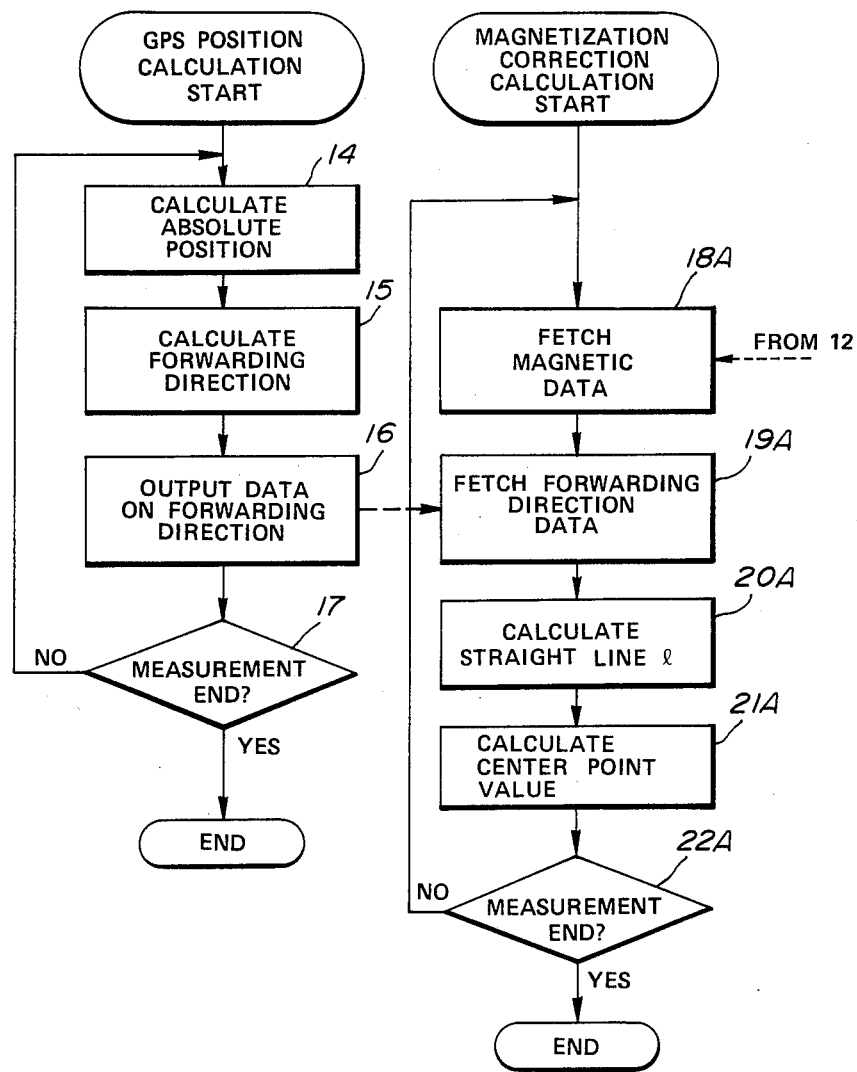
FIGS. 17(a) and 17(b) are integrally operational flowcharts for explaining the whole operation of the fourth preferred embodiment shown in FIG. 13.
Figure 17B:
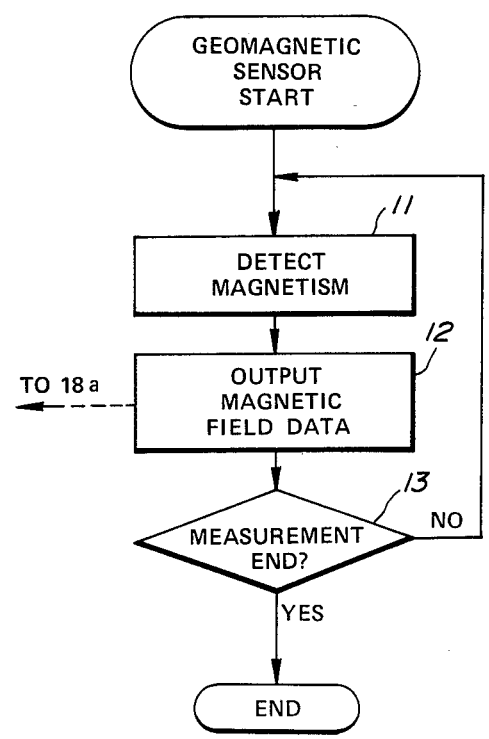

It should be noted that in the flowcharts shown in FIGS. 17(a) and 17(b), the steps denoted by the same numerals have the same contents as those shown in FIGS. 5(a) and 5(b) but steps 18A through 21A are different.

Figure 15:
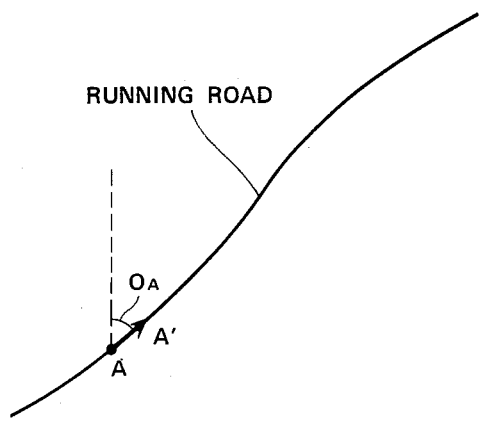
FIG. 15 is a simplified model view for explaining an operation of determining the forwarding direction of the vehicle in the GPS absolute position calculation circuit shown in FIG. 13.

If the forwarding direction of the vehicle is changed during the vehicle run from the point A to the point A' as shown in FIG. 15 and therefore the output data contents of the geomagnetic sensor 1 is accordingly changed, the accurate measurement of relative position of the vehicle cannot be made. In this case, the steering angle sensor described in the second preferred embodiment may be used to determine whether the vehicle runs on the straight road. If the vehicle does not run on the straight road, the calculation of correction for the output data of the geomagnetic sensor due to the magnetization on the vehicle body may be halted.

It should be noted that although a radius of output circle of the geomagnetic sensor 1 is set to 300 mG, the value of 300 mG is slightly changed according to each territorial area on the earth. Furthermore, since the magnitude of horizontal component of the magnetic field of the geomagnetism is largely different between the vicinities of North pole and equator, the magnitude of the magnetic field of the geomagnetism needs to be selected to a value suitable for a territory in which the vehicle moves in which the hybrid navigation system is used.

As described hereinabove, since in the hybrid navigation system and method for determining the relative position and direction of the vehicle according to the present invention, the vehicle body magnetization quantity is calculated using the plurality of the position data of the vehicle calculated in the electromagnetic wave navigation absolute position calculating circuitry and magnetic field output data derived from the geomagnetic sensor, respectively, and correction for the erroneous magnetic field data output derived from the geomagnetic sensor due to the intensity change magnetization on the vehicle body is accurately carried out to eliminate the erroneous indication of the relative position and direction of the vehicle. Therefore, if the center point coordinates of the magnetic field data derived from the geomagnetic sensor 1 are deviated from the reference point, the correction described above can automatically be carried out and the accurate correction therfor can be made with a few positional data in a short time. In addition, if the intensity of magnetization on the vehicle body is abruptly changed, the recorrection on the center point coordinates can quickly be made in the easiest way.

Furthermore, since the correction described above for compensating for the change in the intensity of magnetization on the vehicle body is carried out with the vehicle running on the straight road, a more accurate correction on the center point coordinates of the magnetic field output data derived from the geomagnetic sensor can be achieved at one time.

It will fully be understood by those skilled in the art that the foregoing description is made in terms of the preferred embodiments and various changes and modifications may be made without departing from the scope of the present invention which is to be defined by the appended claims.

What is claimed is:

1. A system mounted on a moving object for determining a position and direction of the moving object relative to a destination, comprising:
    (a) first means for receiving a navigation electromagnetic wave, calculating coordinate positions of the moving object on the earth on the basis of the received electromagnetic wave, and deriving a running direction of travel in which the moving object advances with respect to an orientation of the geomagnetic field as a reference direction on the basis of the calculated coordinate positions;
    (b) second means for detecting a direction of the moving object with respect to the orientation of the geomagnetic field and an intensity of the geomagnetic field on the moving object;
    (c) third means for correcting a detection result of the second means to compensate for an error due to an effect of magnetization of a body of the moving object itself on the basis of the running direction data derived from the first means;
    (d) fourth means for detecting a distance by which the moving object has moved; and
    (e) fifth means for calculating the relative position and direction of the moving object on the basis of the detection result of the fourth means and corrected detection result of the second means derived from the third means.

2. The system according to claim 1, wherein the first means derives a first running direction data of the moving object from measurement results of positions at two adjacent points of location, the second means derives an average value of a second running direction data of the moving object from the measurement results of positions between the two adjacent points which are the same as those by the first means, the fourth means derives a straight line passing the first running direction data received from the first means and an average value of the second running direction data received from the second means, the first means derives a third running direction data from the measurement results of positions at another two adjacent points of location, the second means derives another average value of a fourth running direction data from the measurement results of positions between the other two adjacent points of location which are the same as those by the first means, the fourth means derives another straight line passing the third running value of the fourth running direction data received from the second means and derives an intersection data of the two straight lines.

3. The system according to claim 2, wherein the fifth means receives the intersection data from the fourth means and calculates the distance by which the moving object moves and the running direction of the moving object with respect to a destination at which the moving object will arrive on the basis of the intersection data received from the fourth means as a center point for the relative position calculation.

4. The system according to claim 3, wherein the fifth means derives a vector (QP) for the magnetic field data derived by the second means at a given point of location with respect to the center point (Q) derived by the fourth means and multiplies the vector (QP) by the distance data derived by the third means.

5. A navigation system installed in a moving object, comprising:
    (a) first means for receiving a navigation electromagnetic wave and calculating coordinate positions of the moving object on the earth on the basis of the received navigation electromagnetic wave;
    (b) second means for detecting a direction of the moving object with respect to the geomagnetic field and a magnitude of a magnetic field on the moving object with respect to the geomagnetic field;
    (c) third means for detecting a distance moved by the moving object;
    (d) fourth means for calculating a magnetization quantity on the moving object using running direction data of the moving object calculated from the plurality of adjacent coordinate position data of the moving object by the first means and using a plurality of magnetic field data derived from the second means; and
    (e) fifth means for receiving the magnetization quantity data on the moving object derived from the fourth means and for calculating the distance moved by the moving object and a relative running direction of the moving object without influence of the magnetization on the moving object on the detection result of the second means.

6. The system according to claim 5, which further comprises sixth means for detecting whether the moving object runs on a straight road and outputting a signal indicating that the moving object runs on the straight road to the fourth means and wherein the fourth means halts the calculation of magnetization quantity on the basis of the detection result of the second means when no output signal is received from the sixth means.

7. The system according to claim 6, wherein the moving object is a vehicle and the sixth means comprises a steering angle sensor for detecting an angular displacement of a steering wheel of the vehicle and determining whether each angular displacement falls within a predetermined limit to determine the vehicle run on the straight road.

8. The system according to claim 5, wherein the second means outputs a magnetic field output data to the fourth means whenever a predetermined period of time has passed and wherein the fourth means further comprises seventh means for determining whether the magnetic field output data derived from the second means whenever the predetermined period of time has passed falls within a predetermined range of values to determine whether the moving object runs on a straight road and the fourth means halts the calculation of magnetization quantity on the moving object when determining that the moving object does not run on the straight road.

9. The system according to claim 5, which further comprises sixth means for presetting an intensity of a horizontal component of the geomagnetic field predetermined in a territory and wherein the fourth means calculates the magnetization quantity using a running direction data of the moving object derived by the first means, a magnetic field output data derived by the first means, and the preset intensity of the horizontal component of the geomagnetic field derived by the six means.

10. The system according to claim 9, wherein the fourth means calculates center point coordinates as the magnetization quantity using a straight line passing a point representing the magnetic field output data derived by the first means and the preset intensity derived by the sixth means and outputs the center point coordinate data to the fifth means.

11. The system according to claim 5, wherein the first means comprises a GPS (Global Positioning System) receiving apparatus which receives an electromagnetic wave transmitted by a GPS geostationary satellite and calculates the coordinate position of the moving object on the basis of the electromagnetic wave from the GPS geostationary satellite.

12. A method for determining a relative position and direction of a vehicle to a destination, comprising the steps of:

(a) preparing an X,Y orthogonal coordinates on the earth according to an orientation of the geomagnetic field;
(b) preparing a forward running direction data with respect to the Y coordinate derived from first means for calculating coordinate positions of the vehicle;
(c) preparing a forward running direction data with respect to the Y coordinate derived from second means for detecting an orientation of the vehicle with respect to the geomagnetic field as a reference direction and a magnitude of a magnetic field on the vehicle with respect to the geomagnetic field;
(d) deriving a center point coordinate data deviated from an origin of X,Y coordinates due to a magnetization on a vehicle body on the basis of the forward running direction data derived by the first and second means; and
(e) deriving a relative position and direction of the vehicle on the basis of the center point coordinate data, forward running direction data derived by the second means, and a vehicle running distance data derived by third means, for detecting a distance which the vehicle has travelled.

13. The method according to claim 12, wherein said step (d) comprises the steps of:

(f) drawing a first straight line intersecting the Y coordinate at an angle corresponding to the forward running direction data derived by the first means and a point on the X,Y coordinates representing the forward running direction data derived by the second means;
(g) drawing a second straight line intersecting the Y coordinate at an angle corresponding to another forward running direction data at another point of a road on which the vehicle has travelled, derived by the first means and another point on the X,Y coordinates representing another forward running direction data derived by the second means; and
(h) deriving an intersection of the first and second straight lines as the center point coordinate data.

14. The method according to claim 12, which further comprises the steps of:

(f) detecting whether the vehicle is travelling on a straight road;
(g) inhibiting the step (d) when the vehicle is not travelling on the straight road.

15. The method according to claim 12, which further comprises the step of:

(f) presetting a magnitude of a horizontal component of the geomagnetic field and wherein the step (d) derives the center point coordinate data deviated from the origin of the X,Y coordinate data on forward running direction data derived by the first and second means and the magnitude of the horizontal component preset in the step (f).

* * * * *